(12) United States Patent
Ito

(10) Patent No.: US 12,728,929 B2
(45) Date of Patent: Sep. 8, 2026

(54) CENTER PILLAR

(71) Applicant: SUBARU CORPORATION, Tokyo (JP)

(72) Inventor: Hiroyasu Ito, Tokyo (JP)

(73) Assignee: Subaru Corporation, Tokyo (JP)

( * ) Notice: Subject to any disclaimer, the term of this patent is extended or adjusted under 35 U.S.C. 154(b) by 155 days.

(21) Appl. No.: 18/863,260

(22) PCT Filed: Mar. 29, 2023

(86) PCT No.: PCT/JP2023/012779

§ 371 (c)(1),
(2) Date: Nov. 5, 2024

(87) PCT Pub. No.: WO2024/201769

PCT Pub. Date: Oct. 3, 2024

(65) Prior Publication Data

US 2025/0296636 A1 Sep. 25, 2025

(51) Int. Cl.
*B62D 25/04* (2006.01)
*B62D 29/04* (2006.01)

(52) U.S. Cl.
CPC ........... *B62D 25/04* (2013.01); *B62D 29/043* (2013.01)

(58) Field of Classification Search
CPC .............................. B62D 25/04; B62D 29/043
USPC ..................................................... 296/193.06
See application file for complete search history.

(56) References Cited

U.S. PATENT DOCUMENTS 9,988,094 B1 * 6/2018 Lobisser .............. B62D 29/008
2002/0033618 A1 * 3/2002 Kwon .................. B62D 29/001 296/187.02
2006/0233978 A1 * 10/2006 Yamazaki ............ B62D 29/043 428/34.1

(Continued)

FOREIGN PATENT DOCUMENTS

JP 2015-47895 A 3/2015
JP 2019-182168 A 10/2019

OTHER PUBLICATIONS

International Search Report (ISR) (PCT Form PCT/ISA/210), in PCT/JP2023/012779, dated May 23, 2023 (Japanese and English Version).

(Continued)

*Primary Examiner* — Gregory A Blankenship
(74) *Attorney, Agent, or Firm* — McGinn IP Law Group, PLLC

(57) ABSTRACT

A center pillar made of a fiber reinforced plastic composite material includes tubular members made of a fiber reinforced plastic that are continuous from an upper part to a lower part relative to a center of the center pillar along a longitudinal direction, and an outer layer member disposed around the tubular members and made of a fiber reinforced plastic including a reinforcing fiber wound around the tubular members. The tubular member includes a first tubular member and a second tubular member that are disposed in a front-rear direction of a vehicle body. In a first region of the upper part, the first and second tubular members are in contact with the outer layer member positioned on an outer side in a vehicle width direction. In a second region of the lower part, the first and second tubular members are separated from the outer layer member.

4 Claims, 7 Drawing Sheets

(56) References Cited

U.S. PATENT DOCUMENTS

| | | | | |
|---|---|---|---|---|
| 2012/0313400 | A1* | 12/2012 | Balzer | B62D 25/04<br>296/193.06 |
| 2014/0028056 | A1* | 1/2014 | Nishimura | B62D 25/04<br>296/193.06 |
| 2016/0375940 | A1* | 12/2016 | Tomioka | B32B 3/26<br>296/210 |
| 2017/0327153 | A1* | 11/2017 | Kim | B62D 29/007 |
| 2020/0353989 | A1* | 11/2020 | Sakai | B62D 27/023 |
| 2023/0264760 | A1* | 8/2023 | Noguchi | B62D 29/04<br>296/193.06 |
| 2025/0033704 | A1* | 1/2025 | Ito | B62D 29/048 |
| 2025/0229838 | A1* | 7/2025 | Ito | B62D 25/04 |
| 2025/0296636 | A1* | 9/2025 | Ito | B62D 29/043 |

OTHER PUBLICATIONS

Written Opinion of the International Searching Authority (PCT Form PCT/ISA/237), in PCT/JP2023/012779, dated May 23, 2023 (Japanese version).

* cited by examiner

CENTER PILLAR

CROSS-REFERENCE TO RELATED APPLICATIONS

This application is the U.S. National Phase under 35 U.S.C. § 371 of International Application No. PCT/JP2023/012779, filed on Mar. 29, 2023.

TECHNICAL FIELD

The disclosure relates to a center pillar made of a fiber reinforced plastic composite material.

BACKGROUND

In recent years, for the purpose of reducing the weight of a vehicle body of an automobile such as a passenger car, it has been studied to produce a structural material of the vehicle body by using a fiber reinforced plastic such as a carbon fiber reinforced plastic (hereinafter referred to as CFRP). The structural material made of the fiber reinforced plastic has high rigidity and for example, exhibits high strength against compressive stress or tensile stress acting in an orientation direction of fibers. For example, Patent Documents 1 and 2 disclose a center pillar using a CFRP member for one or some of constituent members.

CITATION LIST

Patent Literature

Patent Document 1: Japanese Unexamined Patent Application Publication 2019-182168

Patent Document 2: Japanese Unexamined Patent Application Publication 2015-47895

SUMMARY

Technical Problem

Here, in order to reduce the weight of the vehicle body, it is desirable that the majority of constituent members of the center pillar be constituted by CFRP members. On the other hand, even when the center pillar includes the CFRP members as main members, the center pillar is intended to serve equivalently to a conventional center pillar made of steel. For example, for a side collision of the vehicle, bending of an upper part of the center pillar is intended to be suppressed in order to protect the head of an occupant, and a lower part of the center pillar is intended to absorb collision energy.

Accordingly, the present disclosure has been made in view of the above problem, and an object of the present disclosure is to provide a center pillar made of a fiber reinforced plastic capable of absorbing collision energy at a lower part of the center pillar in a side collision while maintaining structural continuity of the center pillar.

Solution to Problem

In order to solve the problem described above, according to an aspect of the technique of the present disclosure, a center pillar made of a fiber reinforced plastic composite material includes tubular members made of a fiber reinforced plastic, the tubular members being continuous from an upper part to a lower part relative to a center of the center pillar along a longitudinal direction, and an outer layer member disposed around the tubular members and made of a fiber reinforced plastic including a reinforcing fiber wound around the tubular members, the tubular members made of the fiber reinforced plastic include a first tubular member and a second tubular member that are aligned in a front-rear direction of a vehicle body, and in a first region of the upper part of the center pillar, the first tubular member and the second tubular member are in contact with the outer layer member positioned on an outer side in a vehicle width direction, and in a second region of the lower part of the center pillar, the first tubular member and the second tubular member are separated from the outer layer member positioned on the outer side in the vehicle width direction.

Advantageous Effects of Invention

According to the technique of the present disclosure as described above, it is possible to provide a center pillar made of a fiber reinforced plastic composite material capable of absorbing a collision energy at a lower part of the center pillar in a side collision while maintaining structural continuity of the center pillar.

DETAILED DESCRIPTION

A preferred embodiment of the technique of the present disclosure will be described in detail below with reference to the accompanying drawings. In the present description and the drawings, components including substantially the same functional configurations are denoted by the same reference signs, and redundant description is omitted.

First, an outline of a vehicle body structure including a center pillar according to the present embodiment will be described.

Figure 1:
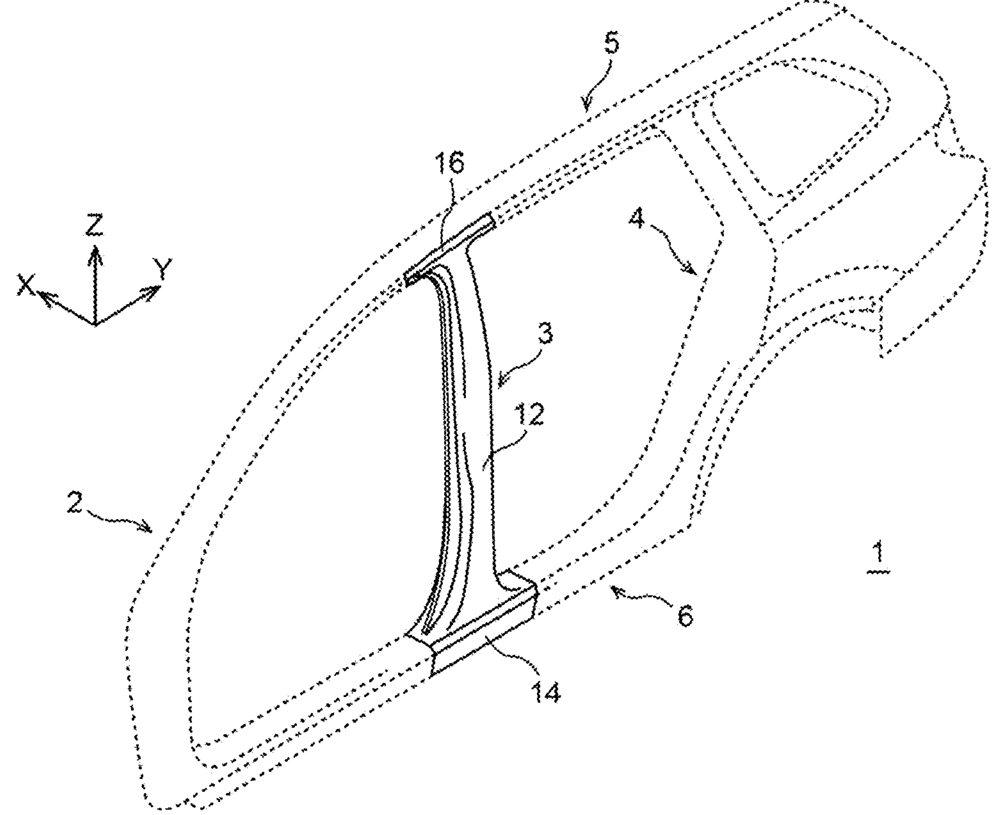
FIG. 1 is a schematic view illustrating a whole configuration of a side structure of a vehicle body according to a present embodiment.

FIG. 1 is a schematic view illustrating an exterior view of a side structure 1 of a vehicle body. The side structure 1 of the vehicle body in FIG. 1 schematically illustrates a part of a structure on a left side of a vehicle. Note that as illustrated in FIG. 1, in the present specification, a vehicle width direction may be referred to as an X direction, a front-rear direction of the vehicle body may be referred to as a Y direction, and a height direction of the vehicle body may be referred to as a Z direction.

The side structure 1 of the vehicle body includes a roof pillar 5, a rear pillar 4, a front pillar 2, a center pillar 3, a side sill 6, and the like. The roof pillar 5 extends along the front-rear direction of the vehicle body at an upper part of a cabin space of the vehicle, and forms a side part of a roof of the vehicle. The side sill 6 extends along the front-rear direction of the vehicle body at a lower part of the side part of the vehicle.

The front pillar 2 has a lower end coupled to a front end of the side sill 6, and an upper end coupled to a front end of the roof pillar 5. The front pillar 2 has a front part constituting the cabin space of the vehicle, and is disposed to support a side of a windshield. The rear pillar 4 has a lower end coupled to a rear end of the side sill 6 and an upper end coupled to a rear end of the roof pillar 5. The center pillar 3 has a lower end coupled to a center of the side sill 6 in the front-rear direction of the vehicle body, and an upper end coupled to a center of the roof pillar 5 in the front-rear direction of the vehicle body.

An opening for a front door is formed so as to be surrounded by the side sill 6, the roof pillar 5, the front pillar 2, and the center pillar 3. An opening for a rear door is formed so as to be surrounded by the side sill 6, the roof pillar 5, the rear pillar 4, and the center pillar 3. Each member included in the side structure 1 of the vehicle body may be constituted by multiple members. For example, each member may be configured by joining an outer panel on an outer side in the vehicle width direction and an inner panel on an inner side in the vehicle width direction.

In the above-mentioned side structure 1 of the vehicle body, the center pillar 3 has a longitudinal direction along the height direction and is formed in a pillar shape. The center pillar 3 includes a roof pillar coupler 16 provided at the upper end thereof, a side sill coupler 14 provided at the lower end thereof, and a pillar body member 12 positioned between the roof pillar coupler 16 and the side sill coupler 14. In the present embodiment, the center pillar 3 is made of a carbon fiber reinforced plastic composite material.

Next, the configuration of the center pillar 3 according to the present embodiment will be described in detail.

Figure 2:
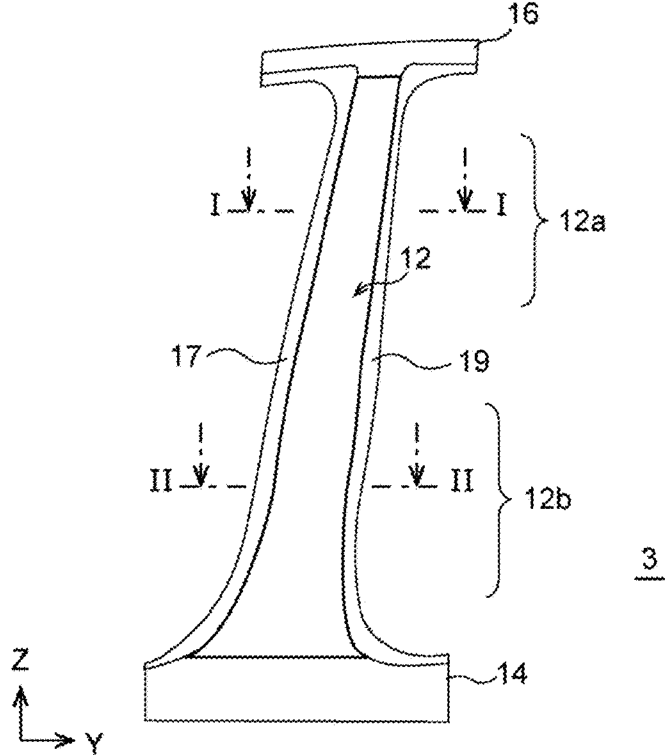
FIG. 2 is an explanatory view for describing a configuration of a center pillar according to the present embodiment.
Figure 3:
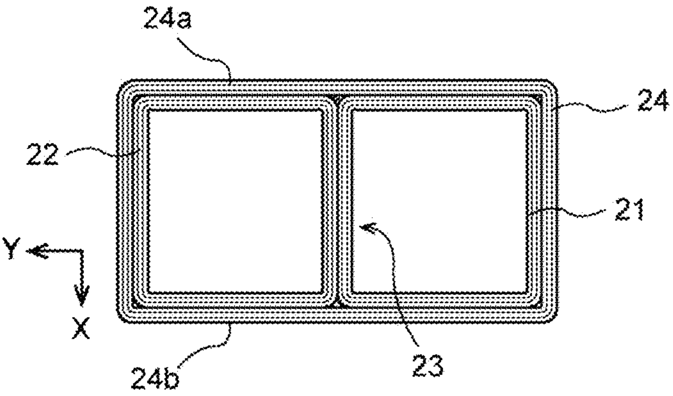
FIG. 3 is an explanatory view illustrating a cross-sectional configuration in a first region of an upper part of the center pillar according to the present embodiment.
Figure 4:
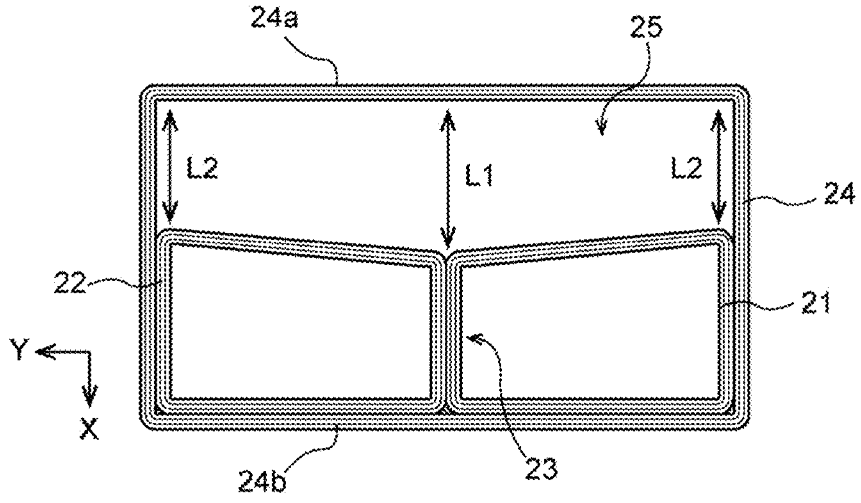
FIG. 4 is an explanatory view illustrating a cross-sectional configuration in a second region of a lower part of the center pillar according to the present embodiment.

FIGS. 2 to 4 are views for describing the configuration of the center pillar 3. The center pillar 3 in FIGS. 2 to 4 is illustrated by simplifying the center pillar 3 of the side structure 1 of the vehicle body in FIG. 1. FIG. 2 is a view of the center pillar 3 viewed from the outer side in the vehicle width direction. FIG. 3 is a cross-sectional view, which is taken along a line I-I with arrows, of a first region 12*a* of the pillar body member 12 illustrated in FIG. 2. FIG. 4 is a cross-sectional view, which is taken along a line II-II with arrows, of a second region 12*b* of the pillar body member 12 illustrated in FIG. 2.

The center pillar 3 includes the roof pillar coupler 16, the side sill coupler 14, the pillar body member 12, and flanges 17 and 19. Each of these members is constituted by a CFRP member, but one or some of these members may include a metal member for coupling or reinforcement (not illustrated).

The roof pillar coupler 16 and the side sill coupler 14 are respectively coupled to an upper end and a lower end of the pillar body member 12, and are formed in a groove shape extending in the front-rear direction of the vehicle body so as to be fitted to the roof pillar 5 and the side sill 6. However, each of the shapes of the roof pillar coupler 16 and the side sill coupler 14 is not limited to the groove shape. The flanges 17 and 19 are provided on both sides in the front-rear direction of the pillar body member 12. The flanges 17 and 19 serve as door stops, for example.

The pillar body member 12 has a pillar shape whose axial direction extends along the height direction. The pillar body member 12 includes tubular members 21 and 22 made of CFRP, and an outer layer member 24 disposed around the tubular members 21 and 22 and made of CFRP including a reinforcing fiber wound around the tubular members 21 and 22 about the Z axis. In the example illustrated in FIGS. 3 and 4, the pillar body member 12 includes, as the tubular members 21 and 22, a first tubular member 21 and a second tubular member 22 that are continuous from an upper part to a lower part relative to the center along the longitudinal direction of the center pillar 3. The first tubular member 21 and the second tubular member 22 are disposed side by side in the front-rear direction in the vehicle body (Y direction).

The first tubular member 21, the second tubular member 22, and the outer layer member 24 are formed by using a fiber reinforced plastic obtained by impregnating carbon fibers with a thermoplastic resin or a thermosetting resin as a matrix resin.

Examples of the thermoplastic resin include polyethylene resin, polypropylene resin, polyvinyl chloride resin, acrylonitrile-butadiene-styrene copolymer synthetic resin (ABS resin), polystyrene resin, acrylonitrile-styrene copolymer synthetic resin (AS resin), polyamide resin, polyacetal resin, polycarbonate resin, polyester resin, polyphenylene sulfide (PPS) resin, fluororesin, polyetherimide resin, polyetherketone resin, and polyimide resin.

The thermoplastic resin may be one or a mixture of two or more among the above resins. Alternatively, the thermoplastic resin may be a copolymer of the above resins. When the thermoplastic resin is a mixture, a compatibilizing agent may be further used in combination. Furthermore, a bromine-based flame retardant, a silicon-based flame retardant, red phosphorus, or the like may be added to the thermoplastic resin as a flame retardant.

Additionally, examples of the thermosetting resin include epoxy resin, unsaturated polyester resin, vinyl ester resin, phenol resin, polyurethane resin, and silicone resin. The thermosetting resin may be one or a mixture of two or more of the above resins. Furthermore, an appropriate curing agent or reaction accelerator may be added to the thermosetting resin.

The carbon fibers may include continuous fibers oriented in the longitudinal direction of the center pillar 3 and continuous fibers oriented in a direction intersecting the longitudinal direction at an appropriate ratio. Adjusting an amount of the continuous fibers oriented in the longitudinal direction makes it possible to adjust a tensile stress to be generated in applying a load caused by a side collision. Adjusting an amount of the continuous fibers oriented in the direction intersecting the longitudinal direction makes it possible to adjust rigidity against the load applied in the side collision, which allows an energy absorption amount to be adjusted. Further, the carbon fibers may include short fibers in addition to the continuous fibers, and may include fibers other than the carbon fibers as reinforcing fibers.

Since each of the first tubular member 21, the second tubular member 22, and the outer layer member 24 is a molded body having a tubular shape and a closed cross-sectional shape, the continuity of the fibers can be held not only in the axial direction (longitudinal direction) but also in a circumferential direction around the axis, and the rigidity against the load applied in the side collision can be increased. Each of the first tubular member 21 and the second tubular member 22 may be a hollow tubular member or may be a solid member filled with a resin or another appropriate material.

As illustrated in FIG. 3, in the first region 12*a* of the upper part of the center pillar 3, the first tubular member 21 and the second tubular member 22 are in contact with a surface 24*a* of the outer layer member 24 positioned on the outer side in the vehicle width direction (on the upper side in the figure). Therefore, in the first region 12*a*, a boundary 23 where the first tubular member 21 and the second tubular member 22 are in contact with each other is coupled to the surface 24*a* of the outer layer member 24. The first region 12*a* includes at least an assumed height range of the head of an occupant. The first region 12*a* is intended to suppress bending of the center pillar 3 in the side collision of the vehicle.

In the first region 12*a*, each of the first tubular member 21 and the second tubular member 22 is in contact with the surface 24*a* and a surface 24*b* of the outer layer member 24 on both sides in the vehicle width direction. Therefore, in the first region 12*a*, the load applied from the outer side of the center pillar 3 in the vehicle width direction in the side collision is quickly transmitted from the surface 24*a* of the outer layer member 24 to the surface 24*b* on an inner side of the outer layer member 24 in the vehicle width direction (on the lower side in the figure) through the first tubular member 21 and the second tubular member 22. Accordingly, the applied load can be received by the entirety of the first tubular member 21, the second tubular member 22, and the outer layer member 24, resulting in suppressing bending of the center pillar 3 in the first region 12*a*.

Further, in the first region 12*a*, since the first tubular member 21 and the second tubular member 22 are disposed side by side in the front-rear direction of the vehicle body, the boundary 23 where the first tubular member 21 and the second tubular member 22 are in contact with each other is coupled to the surfaces 24*a* and 24*b* on both sides of the outer layer member 24 in the vehicle width direction. Therefore, in the first region 12*a*, the boundary 23 serves as a reinforcing rib, and rigidity against the applied load caused by the side collision is increased. This increases reliability of suppressing bending of the center pillar 3 in the first region 12*a*.

On the other hand, as illustrated in FIG. 4, in the second region 12*b* of the lower part of the center pillar 3, the first tubular member 21 and the second tubular member 22 are spaced apart from the surface 24*a* of the outer layer member 24 positioned on the outer side in the vehicle width direction (on the upper side in the figure) to form a cavity 25. Therefore, in the second region 12*b*, the boundary 23 where the first tubular member 21 and the second tubular member 22 are in contact with each other is separated from the surface 24*a* of the outer layer member 24. The second region 12*b* includes at least an assumed range of bumper heights of other vehicles such as passenger cars. The second region 12*b* is intended to absorb an energy applied in the side collision of the vehicle and to mitigate the impact on the inside of the cabin or the like.

In the second region 12*b*, the first tubular member 21 and the second tubular member 22 are in contact with the surface 24*b* of the outer layer member 24 on the inner side in the vehicle width direction and are separated from the surface 24*a* of the outer layer member 24 on the outer side in the vehicle width direction. Therefore, in the second region 12*b*, the outer layer member 24 can be easily crushed by the load applied from the outer side of the center pillar 3 in the vehicle width direction in the side collision up to a position where the surface 24*a* of the outer layer member 24 comes into contact with the first tubular member 21 and the second tubular member 22 by an amount corresponding to a width of the cavity 25, thereby absorbing the collision energy. Further, after the surface 24*a* of the outer layer member 24 comes into contact with the first tubular member 21 and the second tubular member 22, the load can be received by the entirety of the first tubular member 21, the second tubular member 22, and the outer layer member 24, which can suppress entrance of the center pillar 3 into the cabin.

In the second region 12*b*, any energy absorption characteristics can be designed according to the width (a length L) of the cavity 25. Further, also in the second region 12*b*, since the first tubular member 21 and the second tubular member 22 are disposed side by side in the front-rear direction of the vehicle body, the boundary 23 where the first tubular member 21 and the second tubular member 22 are in contact with each other serves as a reinforcing rib, which enhances the rigidity against the applied load caused by the side collision. This enhances the reliability of suppressing entrance of the center pillar 3 into the cabin.

Further, the first tubular member 21 and the second tubular member 22 are continuously disposed from the upper part to the lower part of the center pillar 3 in the longitudinal direction. Therefore, the entire continuity of the center pillar 3 in the longitudinal direction can be obtained, the bending of the center pillar 3 can be suppressed, and the entrance of the center pillar 3 into the cabin can be suppressed. Furthermore, since the center pillar 3 according to the present embodiment has a closed cross-sectional structure in which the outer layer member 24 is provided therearound, even when the collision load is applied in the side collision, the center pillar 3 is less likely to break at a joint or the like as a base point, resulting in suppressing the bending of the center pillar 3 and the entrance of the center pillar 3 into the cabin.

In addition, in the configuration of the second region 12*b* illustrated in FIG. 4, in the cavity 25 between the first tubular member 21 and the second tubular member 22 and the surface 24*a* of the outer layer member 24, a length L1 at a position of the boundary 23 between the first tubular member 21 and the second tubular member 22 is longer than a length L2 at positions on both sides of the vehicle body in the front-rear direction. Thus, the cross-sectional shape of the surfaces of the first tubular member 21 and the second tubular member 22 that face the cavity 25 is a gently recessed shape, and when another vehicle collides with the side surface of the vehicle body, the load from the bumper of the other vehicle having a gently curved surface is easily received by the surfaces of the first tubular member 21 and the second tubular member 22. As a result, the collision load is dispersed, and thus, the bending of the center pillar 3 can be suppressed.

Next, an example of a method for manufacturing the center pillar 3 according to the present embodiment will be described.

First, the first tubular member 21 and the second tubular member 22 are molded by a conventional braiding method, filament winding method, sheet winding method, lay-up method, cold press molding, hot press forming, or the like. The method for molding the first tubular member 21 and the second tubular member 22 is not particularly limited.

Next, the first tubular member 21 and the second tubular member 22 are disposed side by side in a direction intersecting the longitudinal direction, and a water-soluble mold corresponding to the shape of the cavity to be formed is disposed in a region corresponding to the second region 12*b*. The water-soluble mold may be, for example, a salt core, but is not particularly limited as long as the mold can be removed by washing with water in a subsequent process.

Next, the outer layer member 24 is formed around the first tubular member 21, the second tubular member 22, and the water-soluble mold. The outer layer member 24 can be formed by, for example, winding continuous fibers by a winding method, impregnating the fibers with a matrix resin, and curing the matrix resin. According to the winding method, the outer layer member 24 can be formed by continuously winding the fibers over a region where the water-soluble mold is not disposed and a region where the water-soluble mold is disposed.

Next, the water-soluble mold is removed by washing with water or the like, and the roof pillar coupler 16, the side sill coupler 14, and the flanges 17 and 19 are joined at appropriate positions, and thus, the center pillar 3 according to the present embodiment can be obtained.

Although the center pillar 3 according to the embodiment of the present disclosure has been described above, the center pillar 3 according to the above-described embodiment can be variously modified. Some modifications will be described below.

In the second region 12*b*, a member may be disposed between the first tubular member 21 and the second tubular member 22 and the surface 24*a* of the outer layer member 24. The member at least has lower rigidity and higher energy absorption characteristics against the collision load than those of the fiber reinforced plastics constituting the first tubular member 21 and the second tubular member 22.

Figure 5:
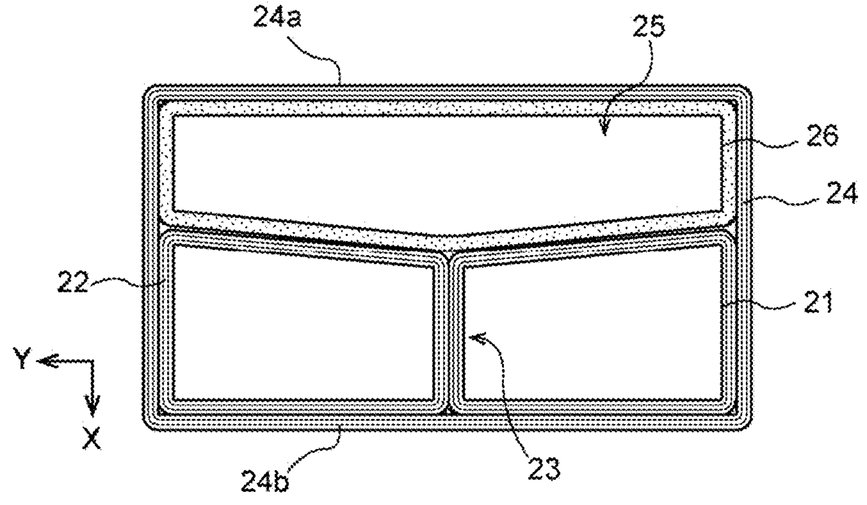
FIG. 5 is an explanatory view illustrating an example in which a third tubular member is disposed in a cavity of the second region.

FIG. 5 illustrates a configuration example in which a third tubular member 26 satisfying the above conditions is disposed between the first tubular member 21 and the second tubular member 22 and the surface 24*a* of the outer layer member 24 in the second region 12*b*. The third tubular member 26 may be a member made of a fiber reinforced plastic including short fibers such as a glass fiber and an aramid fiber. Disposing the third tubular member 26 in the cavity 25 increases the rigidity while the surface 24*a* of the outer layer member 24 is crushed up to a position where the surface 24*a* comes into contact with the first tubular member 21 and the second tubular member 22 as compared with a state where only the cavity 25 is provided, resulting in increasing an energy absorption amount. However, since the rigidity is lower than the rigidities of the first tubular member 21 and the second tubular member 22, when the collision load is applied from the outer side of the second region 12*b* in the vehicle width direction, the third tubular member 26 having the relatively low rigidity is first crushed, and the collision energy can be reliably absorbed.

Note that the member disposed in the cavity 25 is not necessarily a tubular member. A member that fills the entire cavity may be used, or a member that is partially disposed within the cavity may be used.

In addition, the number of tubular members continuous from the upper part to the lower part of the center pillar 3 is not limited to two, and the number thereof is not limited as long as at least two tubular members disposed side by side in the front-rear direction of the vehicle body are included.

Figure 6:
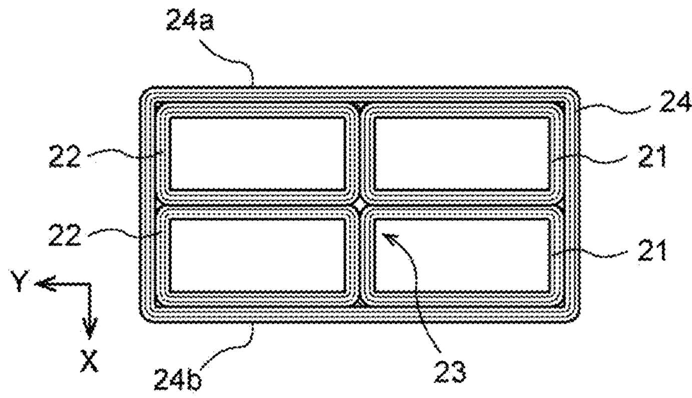
FIG. 6 is an explanatory view illustrating a cross-sectional configuration in a first region of an upper part of a center pillar according to a modification of the present embodiment.
Figure 7:
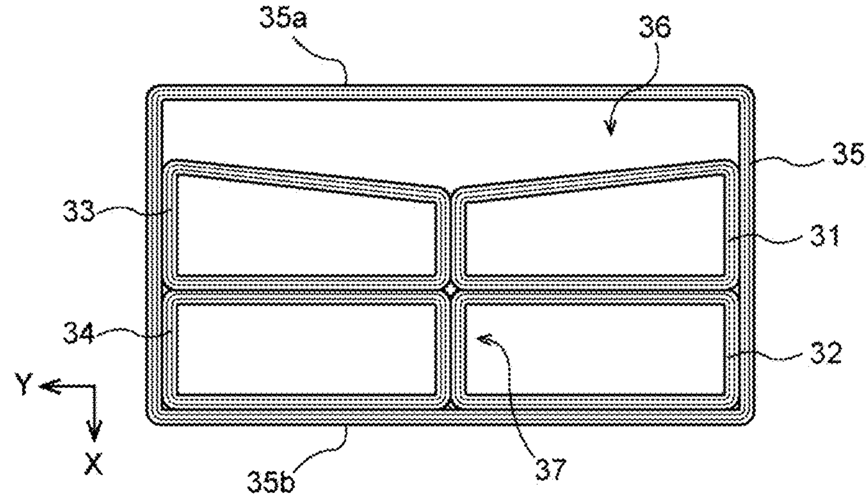
FIG. 7 is an explanatory view illustrating a cross-sectional configuration in a second region of a lower part of the center pillar according to the modification of the present embodiment.

FIGS. 6 and 7 are views for describing a configuration of a center pillar in which the number of tubular members is changed. FIG. 6 is a cross-sectional view in a first region of an upper part of a center pillar according to a modification, and corresponds to a cross-sectional view, which is taken along a line I-I with arrows, of the first region 12*a* of the pillar body member 12 illustrated in FIG. 2. FIG. 7 is a cross-sectional view in a second region of a lower part of the center pillar according to the modification, and corresponds to a cross-sectional view, which is taken along a line II-II with arrows, of the second region 12*b* of the pillar body member 12 illustrated in FIG. 2.

The center pillar according to the modification includes four tubular members 31, 32, 33, and 34 that are continuous from an upper part relative to the center to a lower part relative to the center along the longitudinal direction of the center pillar, and an outer layer member 35 made of CFRP including a reinforcing fiber wound around the tubular members 31, 32, 33, and 34 about the Z axis. The outer layer member 35 is disposed around the tubular members 31, 32, 33, and 34. In the example illustrated in FIGS. 6 and 7, the first tubular member 31 and the second tubular member 32 are disposed side by side in the vehicle width direction (X direction), and the third tubular member 33 and the fourth tubular member 34 are disposed side by side in the vehicle width direction (X direction). The first tubular member 31 and the third tubular member 33 are disposed side by side in the front-rear direction (Y direction) of the vehicle body, and the second tubular member 32 and the fourth tubular member 34 are disposed side by side in the front-rear direction (Y direction) of the vehicle body.

As illustrated in FIG. 6, in the first region of the upper part of the center pillar, the first tubular member 31 and the third tubular member 33 are in contact with the surface 24*a* of the outer layer member 24 positioned on the outer side in the vehicle width direction (on the upper side in the figure). Therefore, in the first region, a boundary 36 where the first tubular member 31 and the second tubular member 32 are respectively in contact with the third tubular member 33 and the fourth tubular member 34 is coupled to a surface 35*a* of the outer layer member 35.

On the other hand, as illustrated in FIG. 7, in the second region of the lower part of the center pillar, the first tubular member 31 and the third tubular member 33 are spaced apart from the surface 35*a* of the outer layer member 35 positioned on the outer side in the vehicle width direction (on the upper side in the figure) to form a cavity 37. Therefore, in the second region, the boundary 36 where the first tubular member 31 and the second tubular member 32 are respectively in contact with the third tubular member 33 and the fourth tubular member 34 is separated from the surface 35*a* of the outer layer member 35.

Even with the configuration including four tubular members 31, 32, 33, and 34 in this way, entire continuity can be obtained in the longitudinal direction of the center pillar, bending of the center pillar in the first region can be suppressed, and collision energy can be absorbed in the second region to suppress entrance of the center pillar into the cabin. Further, providing the four tubular members 31, 32, 33, and 34 increases the number of structural portions of the cross section of the center pillar, resulting in enhancing rigidity of the center pillar against the collision load.

Note that in the center pillar according to the modification, a member at least having lower rigidity and higher energy absorption characteristics against the collision load than those of the fiber reinforced plastic constituting at least the four tubular members 31, 32, 33, and 34 may be disposed in the cavity between the four tubular members 31, 32, 33, and 34 and the surface 35*a* of the outer layer member 35.

The preferred embodiment of the technique according to the present disclosure has been described above with reference to the accompanying drawings, but the technique according to the present disclosure is not limited to the above-mentioned example. It is apparent to those skilled in the art with common knowledge in the technical field of the present disclosure that various variations and modifications may be conceived within the scope of the technical ideas described in the claims. Thus, it is acknowledged that those variations and modifications are also naturally included in the technical scope of the present disclosure. In addition, an aspect in which the above-described embodiment and modifications are combined with each other obviously falls within the technical scope of the present disclosure.

REFERENCE SIGNS LIST

1: Side structure of vehicle body, 3: Center pillar. 5: Roof pillar, 6: Side sill, 12: Pillar body member, 12*a*: First region, 12*b*: Second region, 21: First tubular member, 22: Second tubular member, 23: Boundary, 24: Outer layer member, 24*a*/24*b*: Surface, 25: Cavity, 26: Third tubular member, 31: First tubular member, 32: Second tubular member, 33: Third tubular member, 34: Fourth tubular member, 35: Outer layer member, 35*a*: Surface, 36: Boundary, 37: Cavity

The invention claimed is:

1. A center pillar made of a fiber reinforced plastic composite material, the center pillar comprising:

tubular members made of a fiber reinforced plastic, the tubular members being continuous from an upper part to a lower part relative to a center of the center pillar along a longitudinal direction; and an outer layer member disposed around the tubular members, the outer layer member being made of a fiber reinforced plastic including a reinforcing fiber wound around the tubular members, wherein the tubular members made of the fiber reinforced plastic include a first tubular member and a second tubular member that are aligned in a front-rear direction of a vehicle body, and in a first region of the upper part of the center pillar, the first tubular member and the second tubular member are in contact with the outer layer member positioned on an outer side in a vehicle width direction, and in a second region of the lower part of the center pillar, the first tubular member and the second tubular member are separated from the outer layer member positioned on the outer side in the vehicle width direction.

2. The center pillar according to claim 1, wherein in the first region, a boundary at which the first tubular member and the second tubular member are in contact with each other is coupled to the outer layer member positioned on the outer side in the vehicle width direction, and in the second region, the boundary is separated from the outer layer member positioned on the outer side in the vehicle width direction.

3. The center pillar according to claim 1, wherein in the second region, a cavity is provided between the first tubular member and the second tubular member and the outer layer member positioned on the outer side in the vehicle width direction.

4. The center pillar according to claim 1, wherein in the second region, between the first tubular member and the second tubular member and the outer layer member positioned on the outer side in the vehicle width direction, a member having a lower rigidity and a higher energy absorption characteristic against a collision load than the fiber reinforced plastic included in the tubular members is disposed.

* * * * *